(12) United States Patent
Delaney et al.

(10) Patent No.: US 11,218,485 B1
(45) Date of Patent: Jan. 4, 2022

(54) SYSTEMS AND METHODS FOR PROVIDING TRANSPARENT SIMULTANEOUS ACCESS TO MULTIPLE SECURE ENCLAVES

(71) Applicant: Berryville Holdings, LLC, Herndon, VA (US)

(72) Inventors: Christopher Edward Delaney, Front Royal, VA (US); Chava Louis Jurado, Las Cruces, NM (US); Carl Bailey Jacobs, Fredericksburg, VA (US)

(73) Assignee: Berryville Holdings, LLC, Herndon, VA (US)

( * ) Notice: Subject to any disclaimer, the term of this patent is extended or adjusted under 35 U.S.C. 154(b) by 231 days.

(21) Appl. No.: 16/212,885

(22) Filed: Dec. 7, 2018

Related U.S. Application Data

(60) Provisional application No. 62/597,564, filed on Dec. 12, 2017.

(51) Int. Cl.
    *H04L 29/06* (2006.01)
    *G06F 9/455* (2018.01)
    *G06F 21/45* (2013.01)

(52) U.S. Cl.
    CPC ............ *H04L 63/102* (2013.01); *G06F 9/455* (2013.01); *G06F 21/45* (2013.01); *H04L 63/029* (2013.01); *H04L 63/166* (2013.01)

(58) Field of Classification Search
    None
    See application file for complete search history.

(56) References Cited

U.S. PATENT DOCUMENTS

| | | | | |
|---|---|---|---|---|
| 7,689,716 B2* | 3/2010 | Short | ...................... | H04L 63/08 709/246 |
| 8,139,581 B1* | 3/2012 | Mraz | ..................... | H04L 63/105 370/392 |
| 10,135,677 B1* | 11/2018 | Hankins | .............. | H04L 12/4633 |
| 2007/0081530 A1* | 4/2007 | Nomura | .............. | H04L 63/0272 370/389 |
| 2007/0263658 A1* | 11/2007 | Ung | ...................... | H04L 63/105 370/466 |
| 2012/0084838 A1* | 4/2012 | Inforzato | .............. | G06F 21/575 726/4 |

(Continued)

OTHER PUBLICATIONS

Deborah Shands, Richard Yee and Jay Jacobs, "Secure Virtual Enclaves: supporting coalition use of distributed application technologies", Feb. 2000, Proceedings of the Network and Distributed Systems Security Symposium (NDSS 2000) (Year: 2000).*

*Primary Examiner* — Arezoo Sherkat
(74) *Attorney, Agent, or Firm* — Jones Day

(57) ABSTRACT

Systems and methods for providing simultaneous access to a plurality of discrete, secure private network enclaves are presented. A credential server configured to maintain a repository of available private network enclaves, network locations of enclave access services associated with the available private network enclaves, and credential information regarding which users are permitted access to which private network enclaves, is accessed. Private network enclaves available to a particular user, wherein the accessed private network enclave contain resources for the particular user to access, are accessed. Forwarding to and from resources contained across multiple private network enclaves as if they were available locally in a user virtualized network domain, is provided.

20 Claims, 13 Drawing Sheets

(56) References Cited

U.S. PATENT DOCUMENTS

| | | | |
|---|---|---|---|
| 2012/0096159 A1* | 4/2012 | Short | H04L 63/0892 |
| | | | 709/225 |
| 2014/0109172 A1* | 4/2014 | Barton | H04W 12/0802 |
| | | | 726/1 |
| 2016/0219024 A1* | 7/2016 | Verzun | H04L 9/34 |
| 2017/0054770 A1* | 2/2017 | Wells | H04L 65/1006 |
| 2017/0302535 A1* | 10/2017 | Lee | H04L 41/12 |
| 2017/0359758 A1* | 12/2017 | Chigurupati | H04M 15/66 |
| 2019/0081856 A1* | 3/2019 | Hankins | H04L 41/0806 |
| 2019/0158539 A1* | 5/2019 | Hankins | H04L 67/28 |

* cited by examiner

410 — Oslo (192.168.5.x)
- Database — 192.168.5.23:3306
- Email — 192.168.5.99:993
- File Server — 192.168.5.210:443

420 — London (10.1.x.x)
- Videoconference — 10.1.53.11:443
- Database — 10.1.66.123:3306
- Chat — 10.1.77.93:443
- VoIP — 10.1.100.7:5060

430 — New York (172.16.x.x)
- Videoconference — 172.16.4.12:443
- Database — 172.16.18.2:3306
- Chat — 172.16.20.223:5222
- VoIP — 172.16.23.214:5060

FIG. 4

SYSTEMS AND METHODS FOR PROVIDING TRANSPARENT SIMULTANEOUS ACCESS TO MULTIPLE SECURE ENCLAVES

CROSS-REFERENCE TO RELATED APPLICATIONS

This application claims priority to U.S. Provisional Application No. 62/597,564, filed Dec. 12, 2017, which is incorporated herein by reference in its entirety.

TECHNICAL FIELD

The technology described herein relates to access of remote resources and more particularly to the simultaneous access of multiple resources in multiple secure enclaves.

BACKGROUND

Online resources can be isolated and protected from unauthorized access through various means such as firewalls, Virtual Private Networks (VPNs), and Virtual Private Clouds (VPCs). Each of these has its own particular characteristics, but what they have in common is that they are inconvenient for both users and system administrators. It is often laborious or complex for users to access resources protected within an enclave, and it is often impossible for users to access resources within two or more such enclaves simultaneously. Maintaining access control to all deployed resources on a per-user basis can be complex for a system administrator. In addition, mechanisms to allow simultaneous access to resources in multiple enclaves are often manual and therefore labor-intensive for the system administrator of a large organization.

SUMMARY

A system for providing simultaneous access to a plurality of discrete, secure private network enclaves is presented. The system comprises a plurality of enclave access services, each enclave access service being associated with and positioned in one private network enclave, each private network enclave including one or more resources; a credential server configured to maintain a repository of available private network enclaves, network locations of enclave access services associated with available private network enclaves, and credential information regarding which users are permitted access to which private network enclaves; and a user virtualized network domain service component configured to access private network enclaves available to the user, to connect to available private network enclaves that contain desired resources, and to provide forwarding to and from the desired resources across multiple private network enclaves as if they were available locally in a user virtualized network domain.

As another example, a method of providing simultaneous access to a plurality of discrete, secure private network enclaves is presented. A credential server configured to maintain a repository of available private network enclaves, network locations of enclave access services associated with the available private network enclaves, and credential information regarding which users are permitted access to which private network enclaves, is accessed. Private network enclaves available to a particular user, wherein the accessed private network enclave contain resources for the particular user to access, are accessed. Forwarding to and from resources contained across multiple private network enclaves as if they were available locally in a user virtualized network domain, is provided.

As a further example, a computer-readable medium is encoded with instructions for commanding one or more data processors to execute steps of a method of providing simultaneous access to a plurality of discrete, secure private network enclaves, is presented. A credential server configured to maintain a repository of available private network enclaves, network locations of enclave access services associated with the available private network enclaves, and credential information regarding which users are permitted access to which private network enclaves, is accessed. Private network enclaves available to a particular user, wherein the accessed private network enclave contain resources for the particular user to access, are accessed. Forwarding to and from resources contained across multiple private network enclaves as if they were available locally in a user virtualized network domain, is provided.

BRIEF DESCRIPTION OF THE FIGURES

FIG. 4 is a list of services available for each of the secure enclaves.

DETAILED DESCRIPTION

Figure 1:
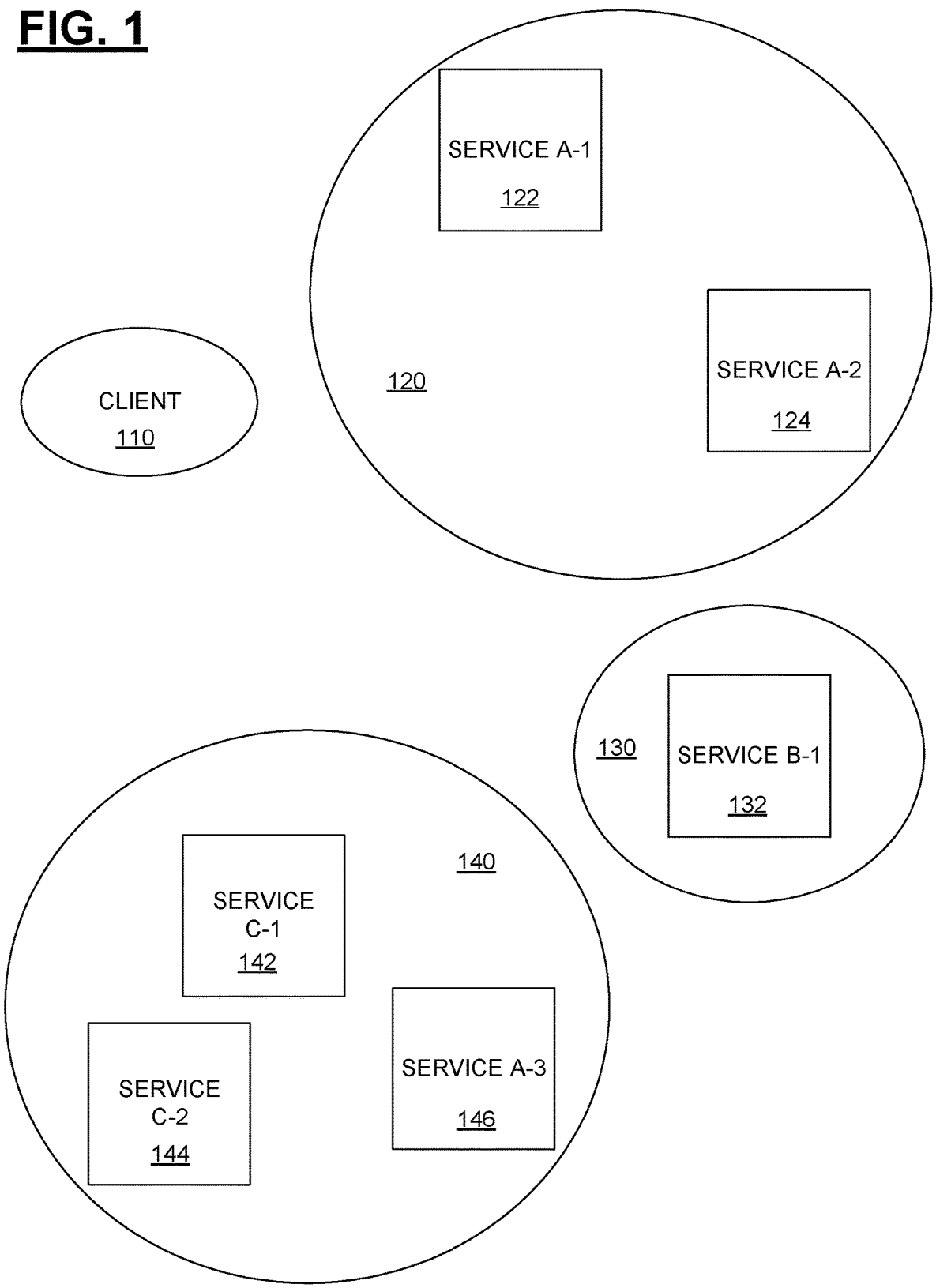
FIG. 1 is a diagram depicting a client and a plurality of discrete, secure enclaves with one or more services.

FIG. 1 is a diagram depicting a client 110 and a plurality of discrete, secure enclaves (120, 130, and 140) with one or more services (122, 124, 132, 142, 144, 146). The circles correspond to the secure enclaves 120, 130, and 140. The squares contained within a circle correspond to one or more services available 122, 134, 132, 142, 144, and 146 in that secure enclave. The client 110 may desire access to the one or more services, e.g. Service A-1 122 and Service A-2 124, in a first secure enclave 120. Alternatively or additionally, the client 110 may desire access to the Service B-1 132 in a second secure enclave 130. Alternatively or additionally, the client 110 may desire access to the one or more services, e.g., Service C-1 142, Service C-2 144, and Service A-3 146, in a third secure enclave 140.

Figure 2:
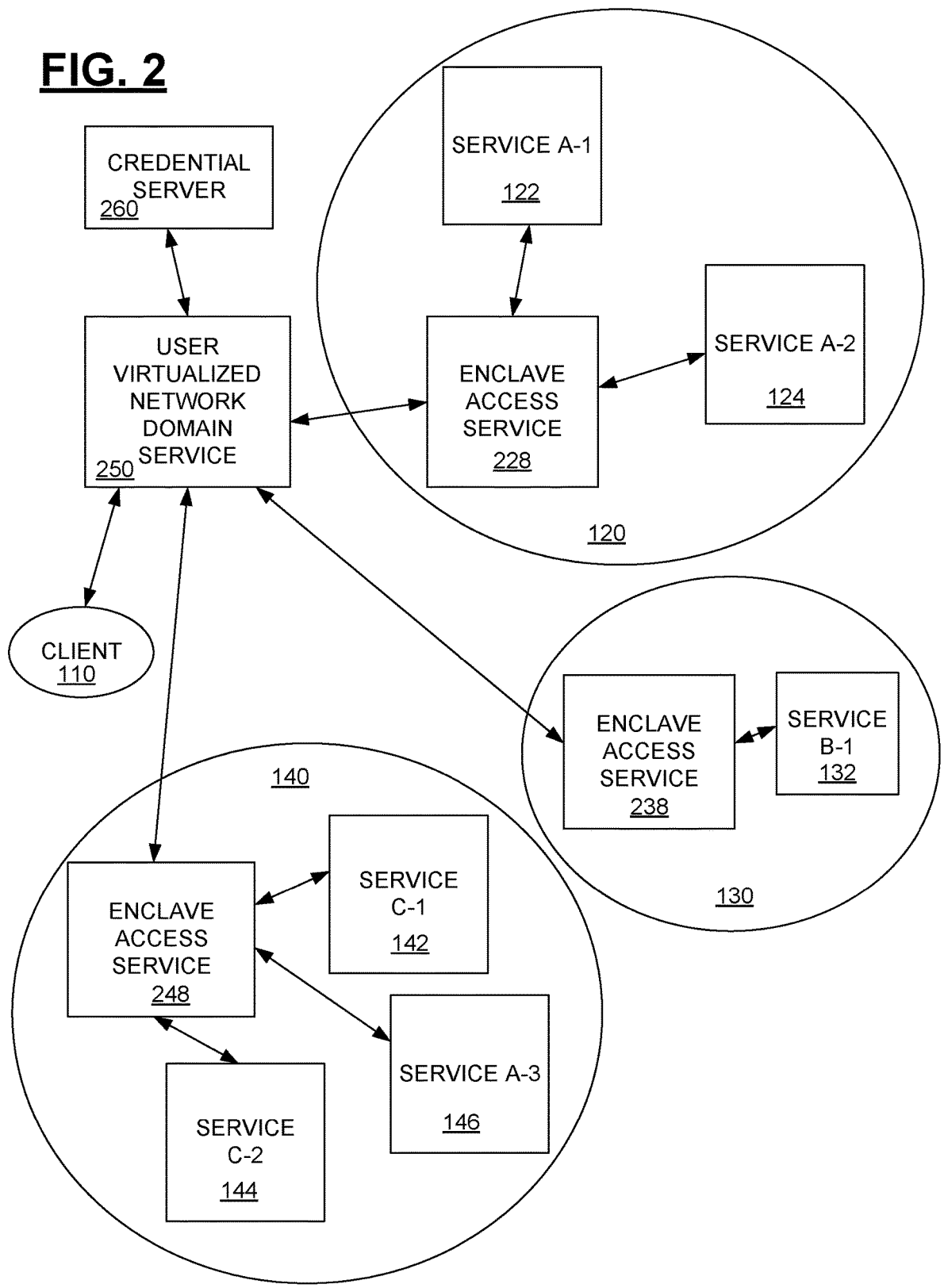
FIG. 2 is a diagram depicting a network configuration for providing the a client access to a plurality of secure enclaves with the one or more services as in FIG. 1.

FIG. 2 is a diagram depicting a network configuration for providing the a client access to a plurality of secure enclaves with the one or more services as in FIG. 1. Instead of communicating directly with the one or more services in the plurality of secure enclaves, the client 110 communicates with a user virtualized network domain service component 250. The virtualized network domain service component 250 is a user-proximate for sometimes remote software service or hardware device running the software service, which provides a fully virtualized network domain space to the client 110. The user virtualized network domain service component 250 provides a single user or a group of users a virtual network workspace.

The user virtualized network domain service component 250 communicates with a credential server 260 to identify available servers and how to access them. The credential server 260 is a software service, running on a real or virtual server, which maintains a record of the available secure enclaves and manages individual user permissions to access the available secure enclaves and the resources they contain. The credential server 260 returns directory information for each of the secure enclaves 120, 130, and 140 to the user virtualized network domain service component 250. One credential server will typically manage the permissions and access control for a given enterprise, or for a logical subgroup, such as a division or branch of a company. A single credential server can support an unlimited number of secure enclaves, each running an enclave access service, and an unlimited number of individual clients or groups of clients, each running a user virtualized network domain service.

The user virtualized network domain service component 250 receives the resource information for all of the resources that a client or group of clients has been granted access to by the system administrator via the credential server 260. The user virtualized network domain service component 250 then communicates directly with an enclave access service in a secure enclave to access servers within that enclave. The enclave access service is a software service, running on a real or virtual server, within a secure enclave, that communicates with the one or more services in the secure enclave. The enclave access service acts as a point-of-entry to the secure enclave. At least one enclave access service instance must be operational within a given secure enclave for that secure enclave to be accessible to users. A plurality of enclave access service instances may be instantiated within a single secure enclave, as required by the organization's policies, in order to separate user accesses and/or dissociate individual users' network traffic.

The client may want to communicate with one or more services, Service A-1 and Service A-2, in the first enclave. The client, through the user virtualized network domain service component, can communicate with the credential server to obtain the necessary resource information to communicate with the Service A-1 122 and Service A-2 124 through an enclave access service 228.

When started, and periodically thereafter, the user virtualized network domain service component 250 may perform certain tasks. A first task that may be performed includes reaching out to the credential server 260 to obtain an up-to-date list of the various secure enclaves, as well as their designated names, and network addresses of their installed enclave access services. A second task that may be performed includes reaching out to each of the enclave access services 228, 238, and 248, presenting credentials for a user using the client 110, and retrieving a list of the network resources (including resource type, short name, and internal network address) available to it. A third task that may be performed includes constructing an internal DNS table, using unique virtual IP addresses, and giving each service component in each enclave a unique virtual IP address and a human-readable name of the form: [shortname].[enclavename].[companydomain]. So, for instance, a Videoconference server in the London secure enclave, accessed via a company.com user virtualized network domain service component 250, would be given the virtual name "videoconference.london.company.com." A fourth task that may be performed includes establishing encrypted tunnels for TCP and UDP network port forwarding between itself and each of the enclave access services 228, 238, and 248, providing a unique network port on the physical interface of the user virtualized network domain service component 250 that forwards all traffic, via the enclave access server, to the appropriate server IP and port inside the appropriate secure enclave. A fifth task that may be performed by the user virtualized network domain service component 250 includes presenting itself to its clients as a network gateway for the virtual IP address pool that it has created. A sixth task that may be performed includes intercepting any traffic to any of the virtual IP addresses, and redirecting those requests to the proper established port-forwarding tunnel, so that the client connects to the server hosting the enclave access service inside the protected enclave. These tasks do not necessarily need to be performed in the noted order.

Figure 3:
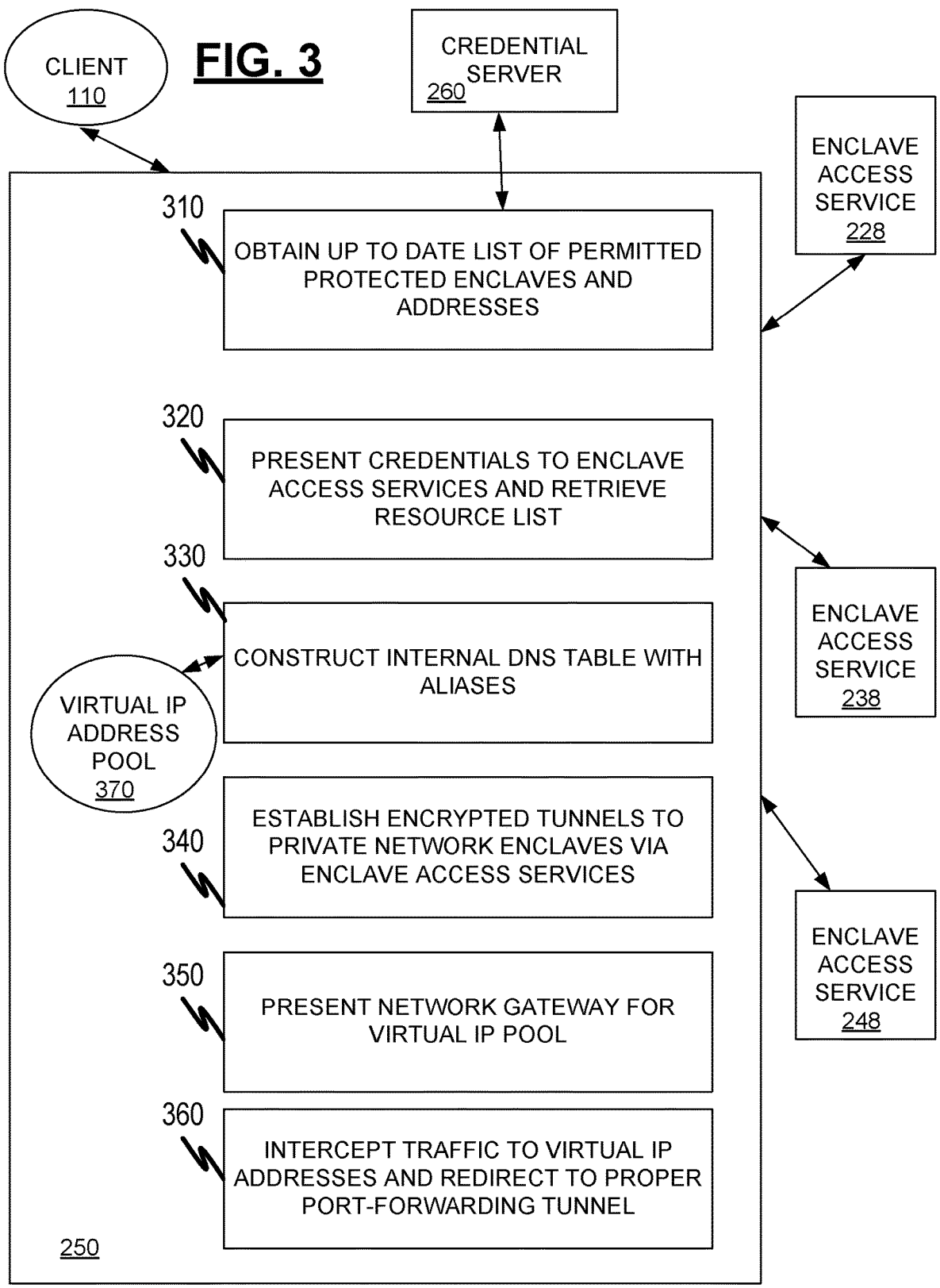
FIG. 3 is a diagram depicting tasks that the user virtualized network domain service component performs in order to provide simultaneous access to a plurality of discrete, secure private network enclaves.

FIG. 3 is a diagram depicting tasks that the user virtualized network domain service component 250 performs in order to provide simultaneous access to a plurality of discrete, secure private network enclaves. The client 110 desires to gain access to one or more enclave access services 228, 238, and 248 to access services residing in corresponding secure enclaves. All communication to/from secure enclave services is directed through the user virtualized network domain service component 250. The user virtualized network domain service component 250 obtains an up-to-date list of permitted secure enclaves and corresponding IP addresses from the credential server at 310. At 320, credentials are presented to enclave access services 228, 238, and 248, and a resource list corresponding to each enclave is retrieved. The user virtualized network domain service component 250 uses its own internal virtual IP address pool 370 to construct an internal DNS table with aliases at 330. At 340, encrypted tunnels to private network enclaves are established via enclave access services 228, 238, and 248. The user virtualized network domain service component presents a network gateway for the virtual IP address pool at 350. At 360, traffic to virtual IP addresses is intercepted and redirected to proper port-forwarding tunnels.

FIG. 4 is a list of services available for each of the secure enclaves of one example. Each of the secure enclaves has one or more services that are identifiable by their IP addresses, which are contained within a particular network address space. The first secure enclave in Oslo 410 uses the 192.168.5.x network address space and has the following network resources online: Database, Email, and File services. The second secure enclave in London 420 uses the 10.1.x.x network address space and has the following network resources online: Videoconference, Database, Chat, and Voice-over-IP (VoIP) services. The third secure enclave in New York 430 uses the 172.16.x.x network address space and has the following network resources online: Videoconference, Database, Chat, and Voice-over-IP services.

Figure 5:
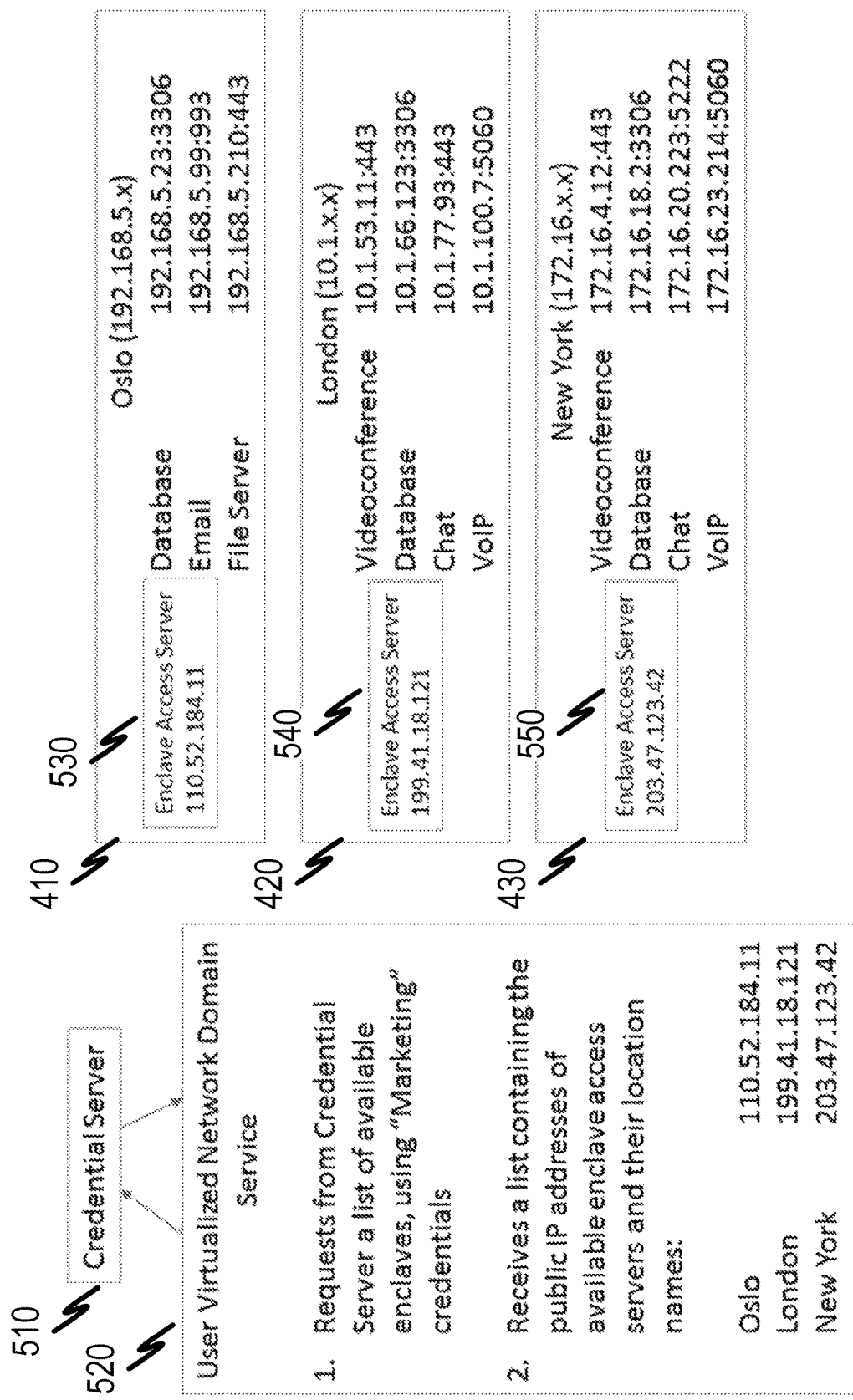
FIG. 5 is a diagram depicting steps that a user virtualized network domain service component takes to access the plurality of secure enclaves in FIG. 4. through a credential server.

FIG. 5 is a diagram depicting steps that a user virtualized network domain service component 520 takes to access the plurality of secure enclaves in FIG. 4. through a credential server 510. A particular business entity, Company.com, has a finance team, a marketing team, and a manager in charge of the collaboration between the two teams. The finance team needs to be able to access the database servers in all of the secure enclaves, but nothing else. The marketing team needs access to all available videoconferencing, chat, VoIP, and mail servers. The manager in charge needs to be able to access all of the services in all of the secure enclaves. Three instances of the user virtualized network domain service (Finance, Marketing, and Manager) will be required to meet these needs, as well as three enclave access servers 410, 420, and 430, each one located in a protected network enclave, configured to be aware of the internal IP addresses and ports where network services are running. Enclave access services run on the enclave access servers 530, 540, and 550.

A system administrator sets up a single credential server 510 with credentials for each of the three instances of the user virtualized network domain service and the network locations of each of the three enclave access servers 410, 420 and 430. The credential server component 510 communicates with each of the enclave access servers 410, 420, and 430, and configures them with the credentials of each user type and the service access allowed to each user type.

In order for the marketing team to be able to access the required services, the Marketing user virtualized network domain service 520 connects to the Company.com credential server, presents it with its pre-configured credentials, and requests a list of available enclave access servers. In response to the request, the user virtualized network domain service component 520 receives a list which contains:

The IP address of the Oslo enclave access server component 530, and the name "oslo"
The IP address of the London enclave access server component 540, and the name "london"
The IP address of the New York enclave access server component 550, and the name "nyc".

Figure 6:
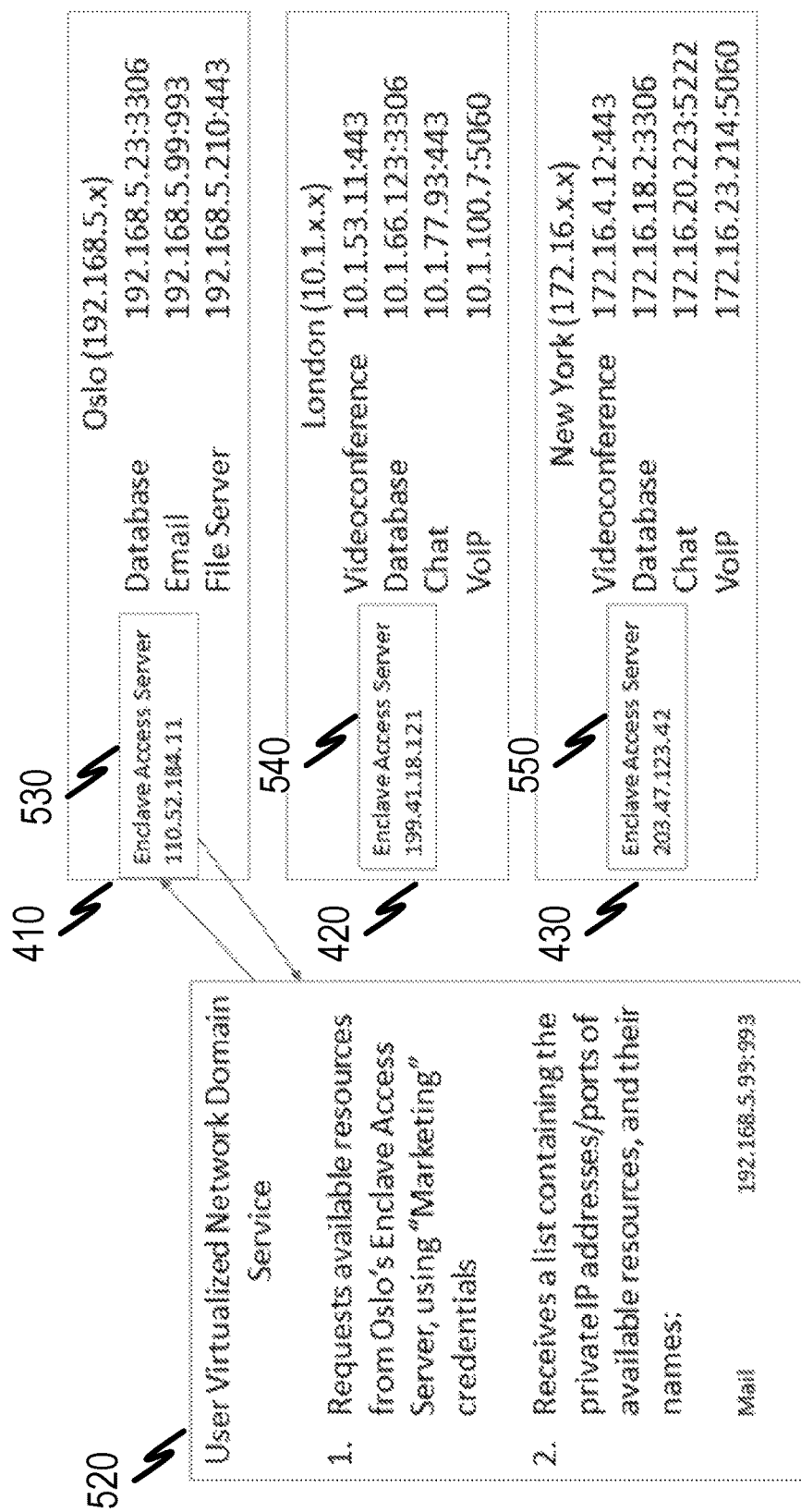
FIG. 6 is a diagram depicting steps that a user virtualized network domain service component for a marketing user takes to access the Oslo enclave access server in FIG. 5.

FIG. 6 is a diagram depicting steps that a virtualized network domain service component 520 for a marketing user takes to access the Oslo enclave access server 530 in FIG. 5. The user virtualized network domain service component 520 requests available resources from Oslo's enclave access server 530, using marketing credentials. The Oslo enclave access server 530 responds to the request by returning a list containing the private IP addresses/ports of available resources, and their names: Mail: 192.168.5.99:993.

Figure 7:
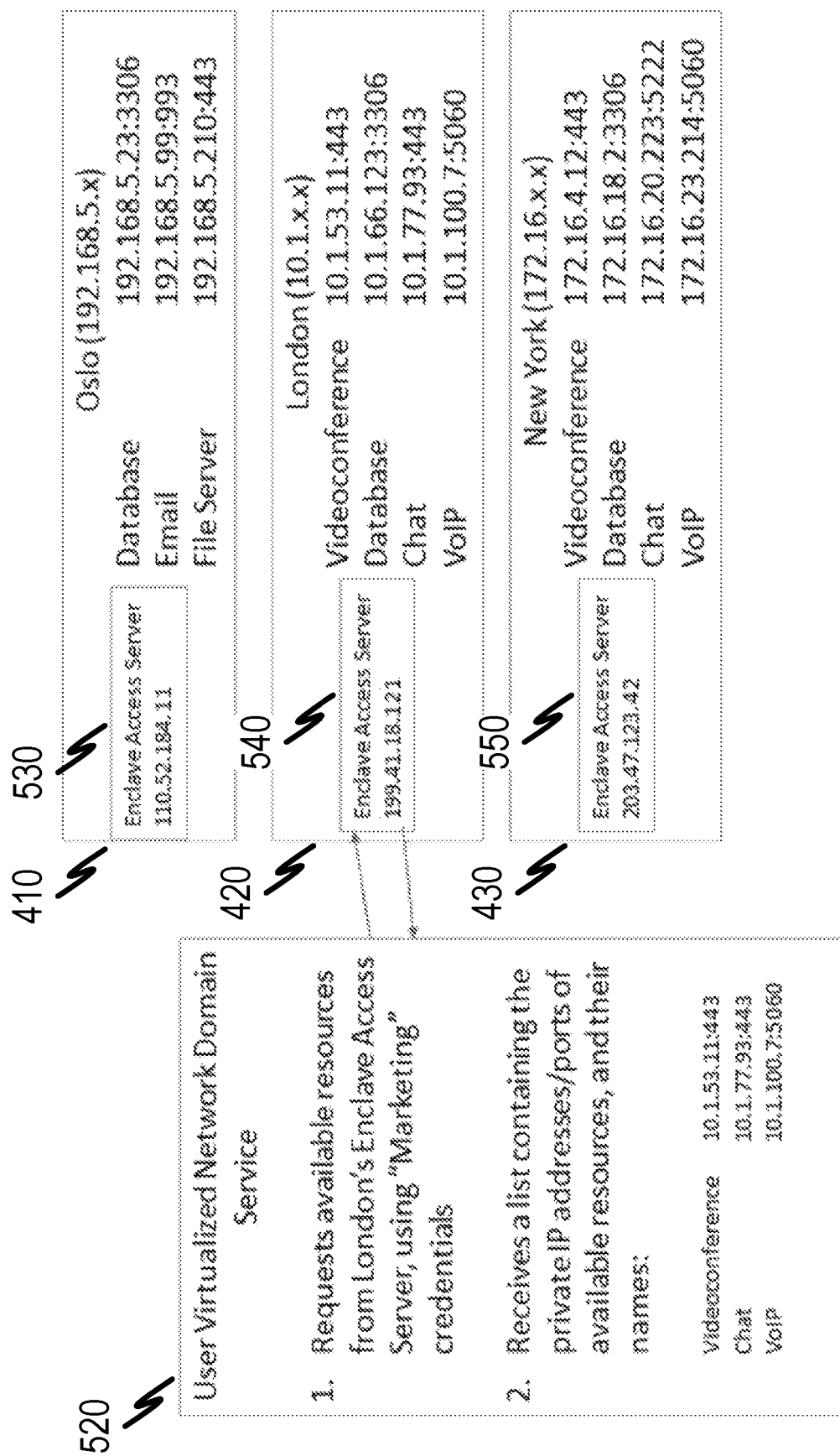
FIG. 7 is a diagram depicting steps that a user virtualized network domain service component for a marketing user takes to access the London enclave access server in FIG. 5.

FIG. 7 is a diagram depicting steps that a user virtualized network domain service component 520 for a marketing user takes to access the London enclave access server 540 in FIG. 5. The user virtualized network domain service component 520 requests available resources from London's enclave access server 540, using marketing credentials. The London enclave access server 540 responds to the request by returning a list containing the private IP addresses/ports of available resources, and their names: Videoconferencing: 10.1.53.11.143; Chat: 10.1.77.93.443; and VoIP: 10.1.100.7: 5060.

Figure 8:
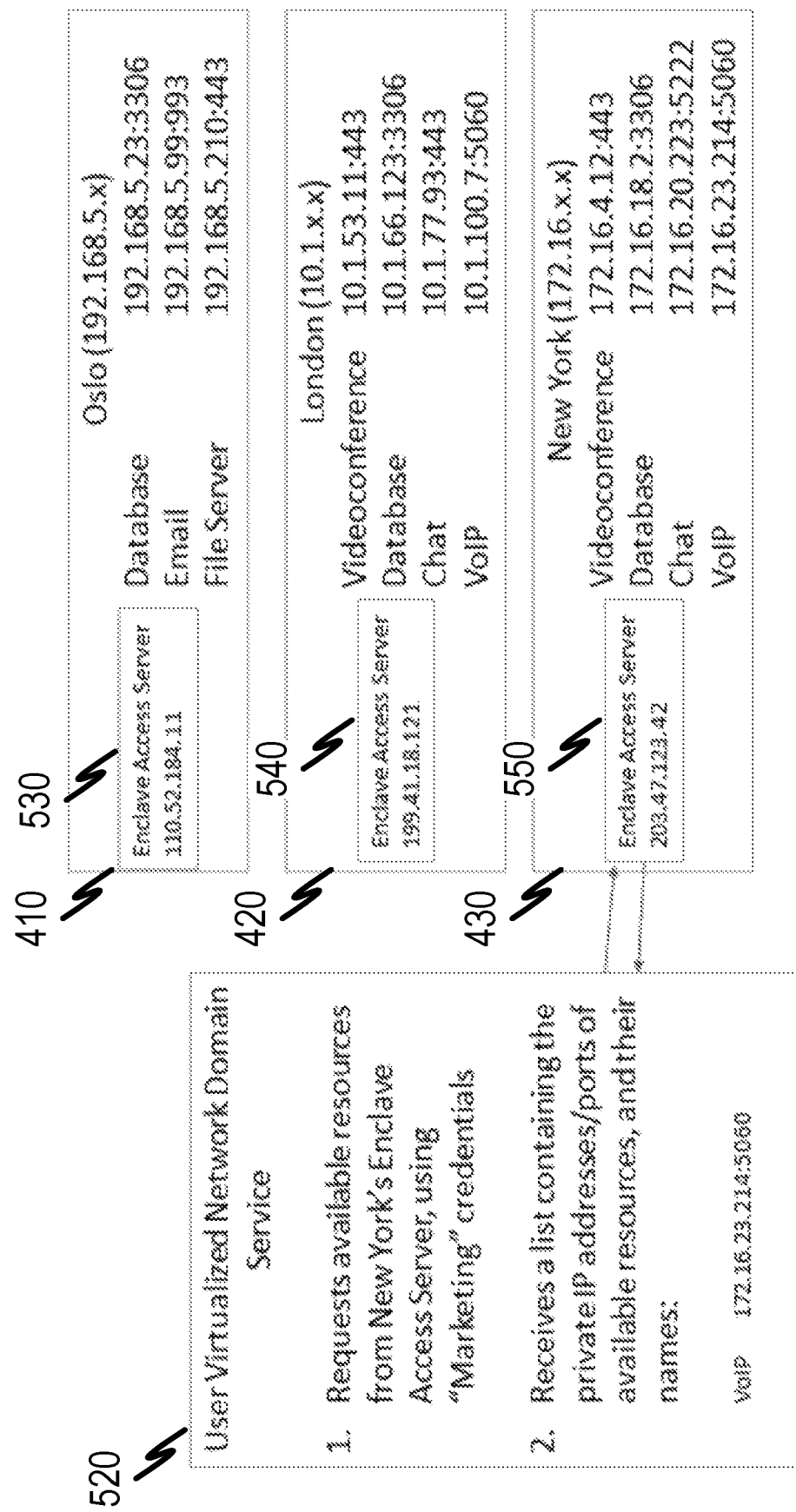
FIG. 8 is a diagram depicting steps that a user virtualized network domain service component for a marketing user takes to access the New York enclave access server in FIG. 5.

FIG. 8 is a diagram depicting steps that a user virtualized network domain service component 520 for a marketing user takes to access the New York enclave access server 550 in FIG. 5. The user virtualized network domain service component 520 requests available resources from New York's enclave access server 550, using marketing credentials. The New York enclave access server 550 responds to the request by returning a list containing the private IP addresses/ports of available resources, and their names: VoIP: 172.16.23.214:5060.

Figure 9:
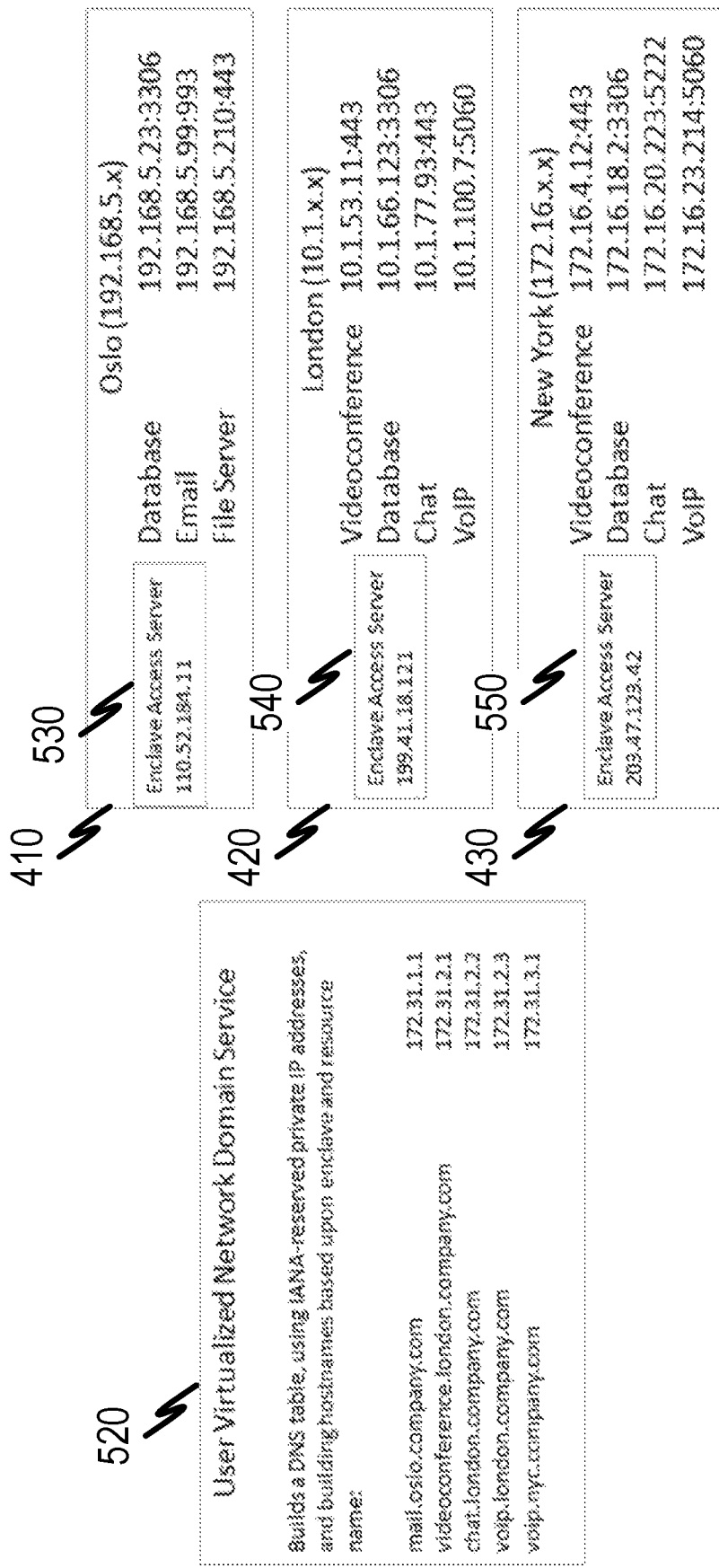
FIG. 9 is a diagram depicting a DNS table created by a user virtualized network domain locally based on the available services in FIG. 5.

FIG. 9 is a diagram depicting a DNS table created by a user virtualized network domain locally based on the available services in FIG. 5. The DNS table uses IANA-reserved private IP addresses and builds hostnames based on secure enclave location and resource name. In an exemplary DNS table, the IP addresses cover the network space 172.31.X.X. As one example, the Email service in Oslo is assigned the alias "mail.oslo.company.com" based on the resource name, or name of the service, and the secure enclave location—Oslo. The alias "mail.oslo.company.com" is mapped in the DNS table to the private IP address, 172.31.1.1. Other services are mapped accordingly. An exemplary DNS table looks as follows:

| Alias | IP Address |
| --- | --- |
| mail.oslo.company.com | 172.31.1.1 |
| videoconference.london.company.com | 172.31.2.1 |
| chat.london.company.com | 172.31.2.2 |
| voip.london.company.com | 172.31.2.3 |
| voip.nyc.company.com | 172.31.3.1 |

Figure 10:
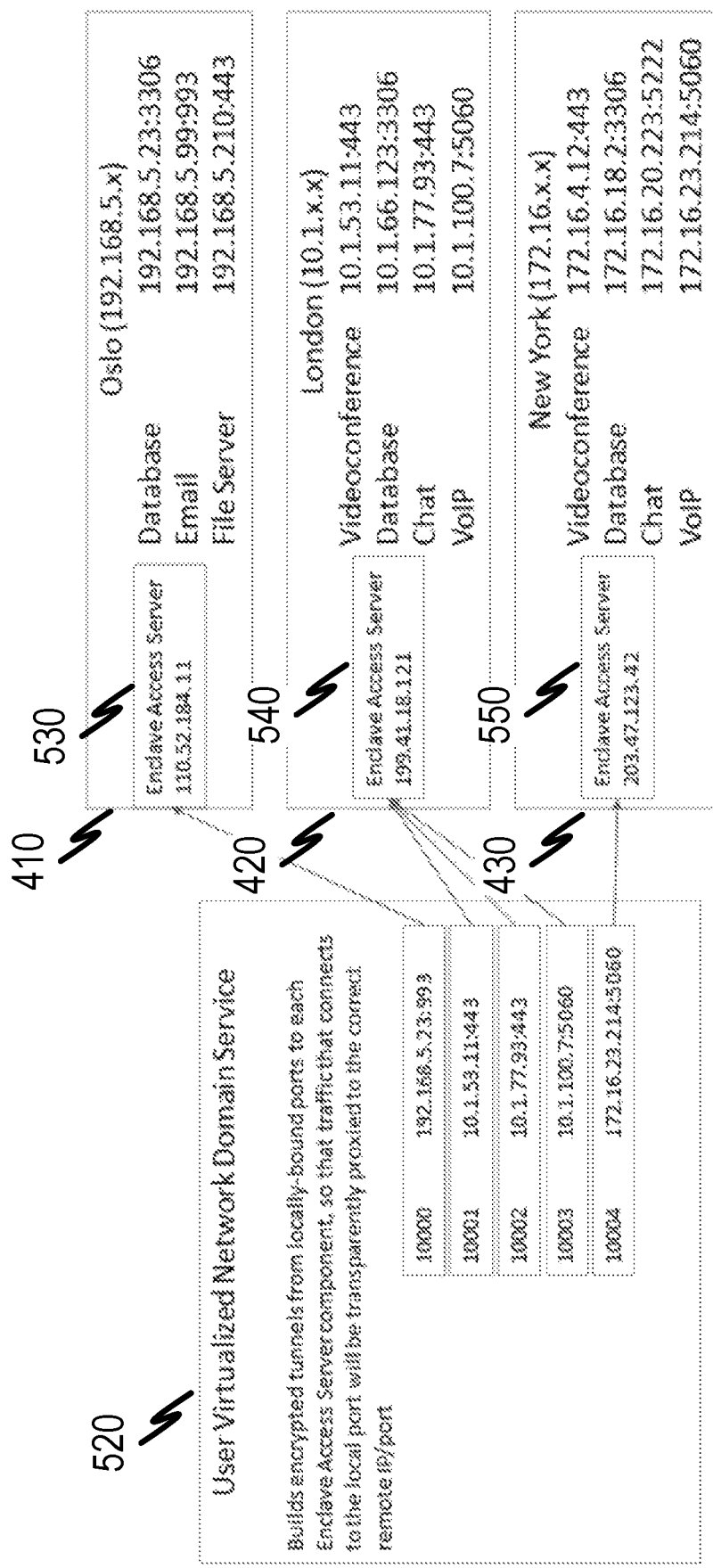
FIG. 10 is a diagram depicting a plurality of encrypted tunnels built by a user virtualized network domain service component, that correspond to services in FIG. 5.

FIG. 10 is a diagram depicting a plurality of encrypted tunnels built by a user virtualized network domain service component 520, that correspond to services in FIG. 5. Each of the tunnels correspond to a service in a secure enclave. The user virtualized network domain service component 520 builds tunnels from locally-bound ports to each enclave access server, so that traffic that connects to the local port will be transparently proxied to the correct remote IP/port. The following port-forwarding tunnels are built:

Local port 10000 redirects to 192.168.5.23:993 via the Oslo enclave access server 530
Local port 10001 redirects to 10.1.53.11:443 via the London enclave access server 540
Local port 10002 redirects to 10.1.77.93:443 via the London enclave access server 540
Local port 10003 redirects to 10.1.100.7:5060 via the London enclave access server 540
Local port 10004 redirects to 172.16.23.214:5060 via the New York enclave access server 550

Figure 11:
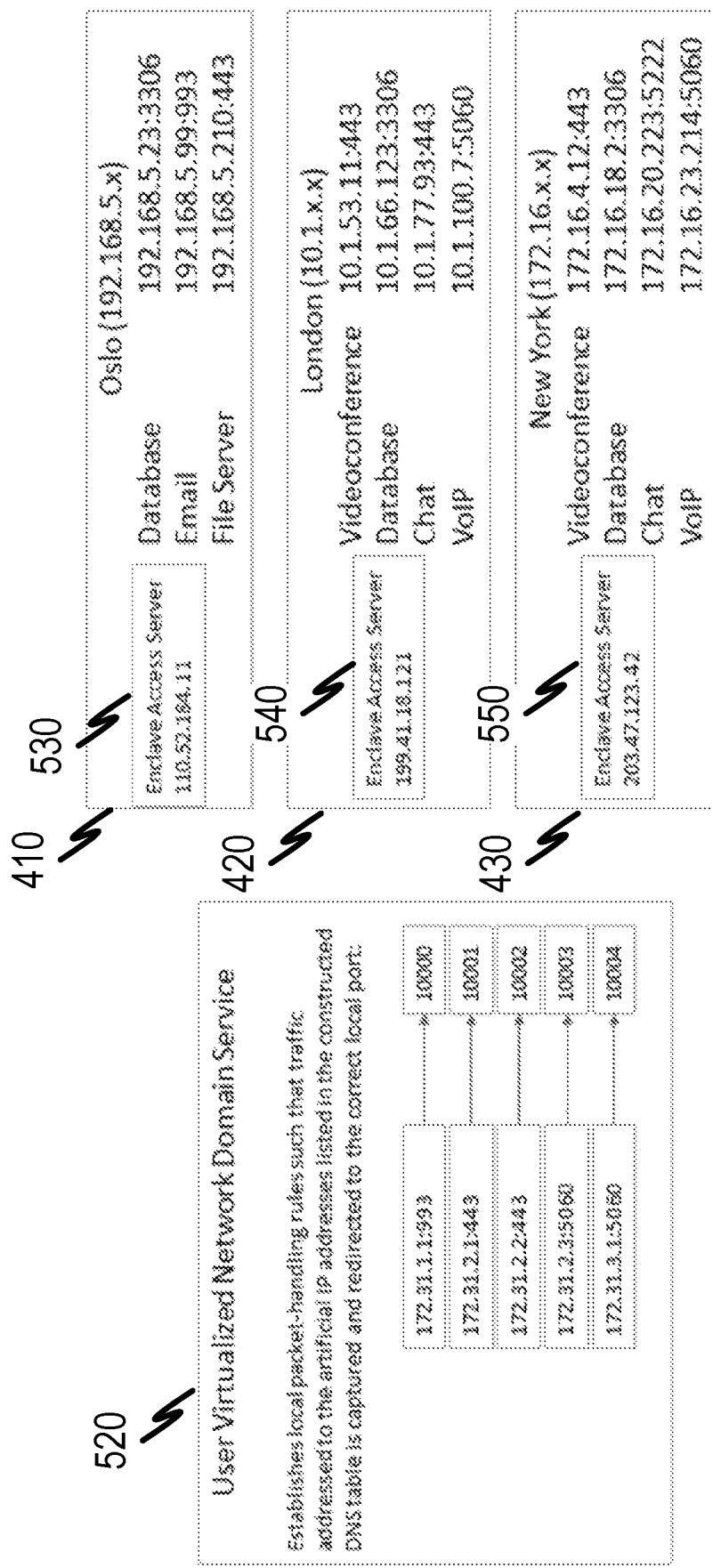
FIG. 11 is a diagram depicting the mapping between the IP addresses in the DNS table of FIG. 9 and the encrypted tunnels in FIG. 10.

FIG. 11 is a diagram depicting mapping between the IP addresses in the DNS table of FIG. 9 and the encrypted tunnels in FIG. 10. In order to achieve the mapping, local packet handling, or destination network address translation (DNAT), rules must be established. The following exemplary network packet-redirection rules are established:

All traffic to 172.31.1.1:993 is DNAT-redirected to local port 10000
All traffic to 172.31.2.1:443 is DNAT-redirected to local port 10001
All traffic to 172.31.2.2:443 is DNAT-redirected to local port 10002
All traffic to 172.31.2.3:5060 is DNAT-redirected to local port 10003
All traffic to 172.31.3.1:5060 is DNAT-redirected to local port 10004

Figure 12:
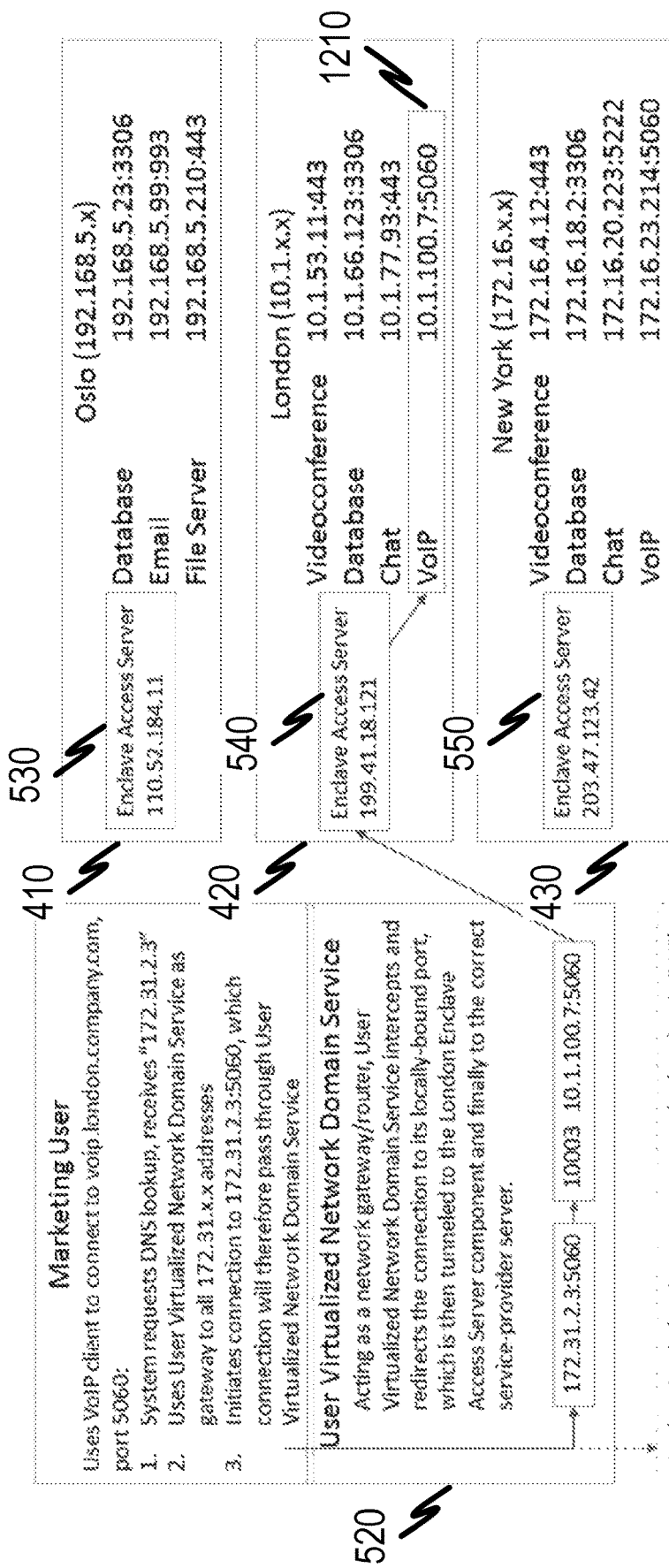
FIG. 12 is a diagram depicting the steps that a client takes in connecting to a service in a secure enclave in FIG. 5 based on the DNS table of FIG. 9 and the encrypted tunnels in FIG. 10.

FIG. 12 is a diagram depicting the steps that a marketing user takes in connecting to a service in a secure enclave in FIG. 5 based on the DNS table of FIG. 9 and the encrypted tunnels in FIG. 10. The marketing user wants to connect to a VoIP service in London, voip.london.company.com, port 5060 using a VoIP client. The system requests a DNS lookup, using the alias "voip.london.company.com." In response to the DNS lookup, the marketing user receives the IP address of 172.31.2.3, which is mapped to the alias "voip.london.company.com" in the DNS table. The software initiates a connection to 172.31.2.3, port 5060 (the default port for VoIP). Because the user virtualized network domain service component is listed as the network routing gateway for the 172.31.x.x network, the connection request is sent to the user virtualized network domain service component 520. The DNAT rule in the user virtualized network domain service component's network stack redirects the connection from the 172.31.2.3:5060 to its own physical network interface, port 10003. The established port-forwarding tunnel accepts the connection on port 10003 and initiates a connection, via the London enclave access server 540, to 10.1.100.7:5060, which is local to the London enclave access server 540. The user's connection is established with the VoIP server 1210. The user virtualized network domain service component 520 is used as a network gateway/router, such that it intercepts and redirects the connection to its locally-bound port, which is then tunneled to the London enclave access server 540 and finally to the correct service.

Figure 13:
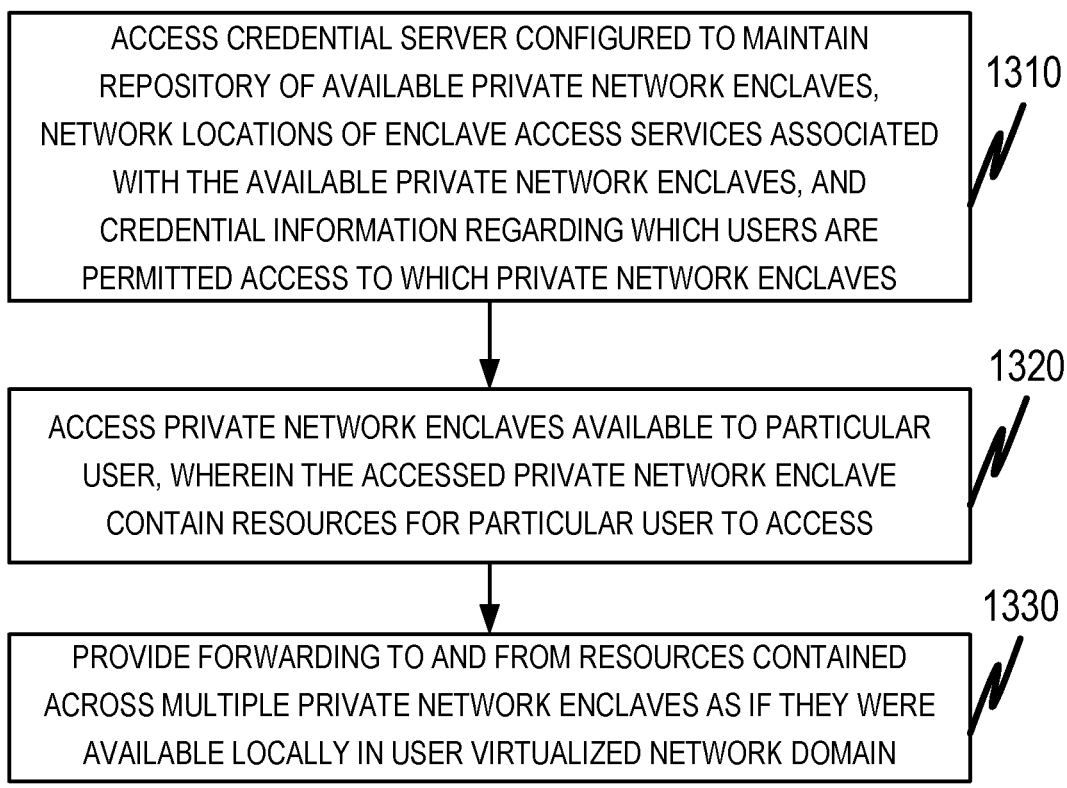
FIG. 13 is a flow diagram depicting a method of providing simultaneous access to a plurality of discrete, secure private network enclaves.

FIG. 13 is a flow diagram 1300 depicting a method of providing simultaneous access to a plurality of discrete, secure private network enclaves. At 1310, a credential server configured to maintain a repository of available private network enclaves, network locations of enclave access services associated with the available private network enclaves, and credential information regarding which users are permitted access to which private network enclaves, is accessed. Private network enclaves available to a particular user, wherein the accessed private network enclave contain resources for the particular user to access, are accessed at 1320. At 1330, forwarding to and from resources contained across multiple private network enclaves as if they were available locally in a user virtualized network domain, is provided.

Examples have been used to describe the invention herein, and the scope of the invention may include other examples.

It is claimed:

1. A system for providing simultaneous access to a plurality of discrete, secure private network enclaves, comprising:
 a plurality of enclave access services, each enclave access service being associated with and positioned in one private network enclave, each private network enclave including one or more resources;
 a credential server configured to maintain a repository of private network enclaves, network locations of enclave access services associated with the private network enclaves, and credential information regarding which users are permitted access to which private network enclaves; and
 a user virtualized network domain service configured to access private network enclaves available to a user, to connect to the private network enclaves that contain desired resources, and to provide network packet forwarding to and from the desired resources across multiple, concurrent, and different private network enclaves as if the resources are available locally in a user virtualized network domain, the network packet forwarding comprising mapping IP addresses in a Domain Name System (DNS) table with encrypted tunnels associated with a respective private network enclave;
 wherein the user virtualized network domain service is further configured to:
 contact a particular enclave access service of a particular private network enclave containing a desired service;
 present access credentials to the particular enclave access service; and
 retrieve, after presenting the access credentials to the particular enclave service, a list of resources available in the particular private network enclave including available collaboration services comprising one or more of: a videoconference service, an email service, a chat service, or a voice over Internet protocol (VOIP) service.

2. The system of claim 1, wherein the user virtualized network domain service is configured to:
 assign each resource available in the particular private network enclave a virtual address via which that resource can be addressed in the user virtualized network domain.

3. The system of claim 2, wherein the user virtualized network domain service is configured to:
 associate each virtual address with an alias address that is not wholly numeric to create a virtual IP address pool.

4. The system of claim 3, wherein clients of the user virtualized network domain service connect to resources across a plurality of private network enclaves using alias maintained in the virtual IP address pool.

5. The system of claim 3, wherein the user virtualized network domain service is configured to intercept traffic directed to a particular virtual address or its alias and to redirect that traffic to an established port-forwarding tunnel such that the traffic is directed to a particular resource in that particular resource's private network enclave.

6. The system of claim 1, wherein the user virtualized network domain service is configured to:
 establish a tunnel between itself and the particular enclave access service of the particular private network enclave containing a desired resource;
 wherein the tunnel provides a unique network port in the user virtualized network domain that forwards traffic to and from the desired resource via the particular enclave access service.

7. The system of claim 6, wherein the tunnel is an encrypted tunnel that provides TCP and UDP network port forwarding.

8. The system of claim 7, wherein the user virtualized network domain service is configured to simultaneously connect to multiple private network enclaves via separate, concurrent virtual private network connections.

9. The system of claim 7, wherein the private network enclaves are distributed across multiple countries.

10. The system of claim 7, wherein a first private network enclave contains a mail server, wherein a second private network enclave includes a video conference server, and wherein a third private network enclave includes a voice-over-IP server.

11. A method of providing simultaneous access to a plurality of discrete, secure private network enclaves, comprising:
 accessing a credential server configured to maintain a repository of private network enclaves, network locations of enclave access services associated with the private network enclaves, and credential information regarding which users are permitted access to which private network enclaves;

accessing private network enclaves available to a particular user, wherein the accessed private network enclaves contain resources for the particular user to access;

providing network packet forwarding to and from resources contained across multiple, concurrent, and different private network enclaves as if the resources are available locally in a user virtualized network domain, the network packet forwarding comprising mapping IP addresses in a Domain Name System (DNS) table with encrypted tunnels associated with a respective private network enclave;

contacting a particular enclave access service of a particular private network enclave containing a particular desired service;

presenting access credentials to the particular enclave access service; and retrieving, after presenting the access credentials to the particular enclave service, a list of resources available in the particular private network enclave including available communication or file sharing collaboration services comprising one or more of: a database service, a videoconference service, an email service, a file server service, a chat service, or a voice over Internet protocol (VOIP) service.

12. The method of claim 11, further comprising:
assigning each resource available in the particular private network enclave a virtual address via which that resource can be addressed in the user virtualized network domain.

13. The method of claim 12, further comprising:
associating each virtual address with an alias address that is not wholly numeric to create a virtual IP address pool.

14. The method of claim 13, wherein clients of the particular desired service connect to resources across a plurality of private network enclaves using alias maintained in the virtual IP address pool.

15. The method of claim 13, further comprising:
intercepting traffic directed to a particular virtual address or its alias and to redirect that traffic to an established port-forwarding tunnel such that the traffic is directed to a particular resource in that particular resource's private network enclave.

16. The method of claim 10, further comprising:
establishing a tunnel between itself and the particular enclave access service of the particular private network enclave containing a desired resource;
wherein the tunnel provides a unique network port in the user virtualized network domain that forwards traffic to and from the desired resource via the particular enclave access service.

17. The method of claim 16, wherein the tunnel is an encrypted tunnel that provides TCP and UDP network port forwarding.

18. A non-transitory computer-readable medium encoded with instructions for commanding one or more data processors to execute steps of a method of providing simultaneous access to a plurality of discrete, secure private network enclaves, the method comprising:

accessing a credential server configured to maintain a repository of private network enclaves, network locations of enclave access services associated with the private network enclaves, and credential information regarding which users are permitted access to which private network enclaves;

generating a Domain Name System (DNS) table, mapping available enclave access services to an IP address associated with a user virtualized network domain;

accessing private network enclaves available to a particular user, wherein the accessed private network enclave contain resources for the particular user to access; and providing network packet forwarding to and from resources contained across multiple concurrent, and different private network enclaves as if the resources are available locally in the user virtualized network domain, the network packet forwarding comprising mapping IP addresses in the DNS table with encrypted tunnels associated with a respective private network enclave;

contacting a particular enclave access service of a particular private network enclave containing a particular desired service;

presenting access credentials to the particular enclave access service;

retrieving, after presenting the access credentials to the particular enclave service, a list of resources available in the particular private network enclave including resource type, internal DNS table, and internal network address, the resources comprising one or more of: a database service, a videoconference service, an email service, a file server service, a chat service, or a voice over Internet protocol (VOIP) service; and assign each resource available in the particular private network enclave a virtual address via which that resource can be addressed in the user virtualized network domain.

19. The method of claim 1 further comprising:
establishing a tunnel with the particular enclave access service of the particular private network enclave containing a desired resource that provides a unique network port in the user virtualized network domain that forwards traffic to and from the desired resource via the particular enclave access service and port forwarding.

20. The non-transitory computer-readable medium of claim 18, wherein the method further comprises:
establishing a tunnel with the particular enclave access service of the particular private network enclave containing a desired resource that provides a unique network port in the user virtualized network domain that forwards traffic to and from the desired resource via the particular enclave access service and port forwarding.

* * * * *